(12) United States Patent
Im et al.

(10) Patent No.: US 11,927,043 B2
(45) Date of Patent: Mar. 12, 2024

(54) APPARATUS FOR AUTOMATICALLY OPENING AND CLOSING TRUNK LID

(71) Applicants: Hyundai Motor Company, Seoul (KR); Kia Motors Corporation, Seoul (KR); Pyeong Hwa Automotive Co., LTD., Daegu (KR)

(72) Inventors: Yong-Hyuck Im, Seoul (KR); Jae-Hoon Chung, Hwaseong-si (KR); Doo-Jung Kim, Daegu (KR)

(73) Assignees: Hyundai Motor Company, Seoul (KR); Kia Motors Corporation, Seoul (KR); Pyeong Hwa Automotive Co., Ltd., Daegu (KR)

( * ) Notice: Subject to any disclaimer, the term of this patent is extended or adjusted under 35 U.S.C. 154(b) by 474 days.

(21) Appl. No.: 17/184,754

(22) Filed: Feb. 25, 2021

(65) Prior Publication Data
US 2022/0136302 A1  May 5, 2022

(30) Foreign Application Priority Data
Oct. 29, 2020 (KR) .......... 10-2020-0141791

(51) Int. Cl.
*E05F 1/00* (2006.01)
*B62D 25/10* (2006.01)
(Continued)

(52) U.S. Cl.
CPC ............ *E05F 1/1253* (2013.01); *B62D 25/10* (2013.01); *E05B 79/20* (2013.01); *E05B 81/14* (2013.01); *E05B 83/18* (2013.01); *E05Y 2201/474* (2013.01); *E05Y 2201/654* (2013.01); *E05Y 2900/516* (2013.01)

(58) Field of Classification Search
CPC ..... E05F 1/1066; E05F 1/1075; E05F 1/1276; E05F 1/1253; E05F 1/1269; E05B 81/06; E05B 81/20; E05B 81/14; E05B 83/14; E05B 79/20; E05B 81/34; B62D 25/10; E05Y 2900/548; E05Y 2900/516; E05Y 2201/22; E05Y 2201/664; E05Y 2201/474; E05Y 2201/488; E05Y 2201/654
See application file for complete search history.

(56) References Cited

U.S. PATENT DOCUMENTS 5,896,703 A * 4/1999 Wright .................. F16D 27/112
74/505
6,092,336 A * 7/2000 Wright .................. E05F 15/627
49/340
(Continued)

FOREIGN PATENT DOCUMENTS

KR  101923887 B1  11/2018

*Primary Examiner* — Chi Q Nguyen
(74) *Attorney, Agent, or Firm* — Slater Matsil, LLP

(57) ABSTRACT

An apparatus for automatically opening and closing a trunk lid includes a drum member connected to a first cable and rotatably coupled to a drum bracket fastened to a hinge arm, a power latch cinching actuator including an output gear configured to be rotated by a motor embedded in a housing, and an elastic spring having a first end coupled to the drum member and a second end configured to be coupled to the trunk lid, wherein the first cable is coupled to the output gear and is configured to rotate the drum member in a first direction when the output gear is rotated.

20 Claims, 24 Drawing Sheets

(51) Int. Cl.
*E05B 79/20* (2014.01)
*E05B 81/14* (2014.01)
*E05B 83/18* (2014.01)
*E05F 1/12* (2006.01)

(56) References Cited

U.S. PATENT DOCUMENTS

| | | | | |
|---|---|---|---|---|
| 6,102,453 | A * | 8/2000 | Cetnar | E05B 81/06 |
| | | | | 292/201 |
| 9,428,944 | B1 * | 8/2016 | Elia | E05C 19/024 |
| 2016/0369536 | A1 * | 12/2016 | Elia | B60J 5/104 |
| 2017/0136985 | A1 * | 5/2017 | Narita | E05D 7/086 |
| 2018/0086185 | A1 * | 3/2018 | Kato | B62D 25/12 |
| 2018/0187459 | A1 * | 7/2018 | Yokota | E05B 81/20 |
| 2019/0271179 | A1 * | 9/2019 | Patane | E05B 81/36 |
| 2020/0284068 | A1 * | 9/2020 | Cumbo | E05B 81/20 |
| 2020/0332570 | A1 * | 10/2020 | Tomaszewski | E05B 81/34 |
| 2021/0180370 | A1 * | 6/2021 | Oda | E05B 81/32 |
| 2022/0075244 | A1 * | 3/2022 | Zhou | G02B 13/16 |

* cited by examiner

<FIRST STAGE LOCKING>   <SECOND STAGE LOCKING>

APPARATUS FOR AUTOMATICALLY OPENING AND CLOSING TRUNK LID

CROSS-REFERENCE TO RELATED APPLICATIONS

This application claims priority to Korean Patent Application No. 10-2020-0141791, filed on Oct. 29, 2020, which application is hereby incorporated herein by reference.

TECHNICAL FIELD

The present disclosure relates to an apparatus for automatically opening and closing a trunk lid for a vehicle.

BACKGROUND

FIG. 1 schematically illustrates a conventional general apparatus for opening and closing a trunk lid.

A trunk room of a passenger vehicle is a space in the rear of a vehicle for storing cargo and is mounted with a trunk lid to be opened and closed.

The design and form of the trunk lid may be diverse, but generally, the trunk lid has a bent panel shape so as to shield the top and rear side of the trunk room, and is coupled to a vehicle body by a hinge arm 14 to be opened and closed as the hinge arm is rotated.

The edge of the trunk lid and the vehicle body are mounted with a striker and a power latch 11 for controlling the opening of the trunk lid when the trunk lid is closed, respectively, in which the power latch 11 is connected to a power latch cinching actuator (ACT) 12 by a wire, and lifters such as a gas lifter 13 and a torsion bar are added to lift the trunk lid when the striker is released from the power latch 11.

A power trunk is an apparatus for opening and closing the trunk lid using the force of a motor in order to improve the user's convenience, and is configured such that the trunk lid is opened and closed using a switch or a remote controller attached to the vehicle body.

As illustrated, the power trunk has a gas lifter 13 coupled to the hinge arm 14 having one end coupled to the trunk lid and the other end rotatably coupled to the vehicle body, and the gas lifter 13 expands as the striker is released from the latch, and thus the trunk lid is opened, and the trunk lid is closed by overcoming the elastic force of the gas lifter 13 by the operation of a drive unit 15.

The drive unit 15 is configured by coupling a motor, a control unit, and a gear device.

However, the power trunk has the limit in which only the luxury vehicle is applied due to the excessive cost and weight, and also causes the noise due to a large motor.

The contents described in this section are to help the understanding of the background of the present disclosure, and may include what is not previously known to those skilled in the art to which the present disclosure pertains.

SUMMARY

The present disclosure is devised to solve problems in the art, and an embodiment of the present disclosure provides an apparatus for smoothly and automatically opening and closing a trunk lid by adding a layout change function of a spring while using a conventional latch cinching actuator without a large motor.

An apparatus for automatically opening and closing a trunk lid according to one embodiment of the present disclosure includes a drum member rotatably coupled to a drum bracket fastened to a hinge arm, and connected to a first cable, a power latch cinching actuator including an output gear rotated by a motor embedded in a housing, and an elastic spring having one end coupled to the drum member, and the other end coupled to a trunk lid, in which the first cable is inserted into the output gear, and rotates the drum member in a first direction when the output gear is rotated.

Here, the output gear is formed with a first slot and a second slot having an arc shape.

Further, the edge of the first cable is inserted into the first slot, and the edge of the second cable is inserted into the second slot.

Meanwhile, one side surface of the housing is formed with a first cable inlet into which the first cable is inserted and a second cable inlet into which a second cable is inserted.

Here, when a point adjacent to one side surface of the housing of the output gear is located in the 6 o'clock direction of the output gear, in the state where the trunk lid is closed, one end of the first slot is located in the 3 o'clock direction of the output gear and the other end thereof is located in the 12 o'clock direction of the output gear, and one end of the second slot is located in the 9 o'clock direction of the output gear and the other end thereof is located in the 12 o'clock direction of the output gear.

Further, in the state where the trunk lid is closed, the edge of the first cable is located on one end of the first slot, and the edge of the second cable is located on one end of the second slot.

Further, when an opening command of the trunk lid is applied, the output gear is rotated counterclockwise, such that the first cable is pulled.

Furthermore, when an opening command of the trunk lid is applied, the output gear is rotated 90 degrees counterclockwise.

Meanwhile, the power latch cinching actuator further includes a torsion spring coupled between the housing and the output gear, and the trunk lid is closed and then the output gear remains in place by the restoring force of the torsion spring.

More specifically, when a closing command of the trunk lid is applied, the drum member pulls the first cable by the operation of the power latch cinching actuator, such that the first cable returns to a location in the state where the trunk lid is closed.

Therefore, the location of the elastic spring is changed as the drum member rotates in the second direction, such that a moment according to the first cable becomes larger than a moment according to the elastic spring.

Further, when a closing command of the trunk lid is applied, the trunk lid is closed by its own weight.

Here, the location of the elastic spring is changed as the drum member rotates in the first direction, such that a moment according to the elastic spring becomes larger than a moment according to the first cable.

Meanwhile, the apparatus for automatically opening and closing the trunk lid may further include a power latch including a latch lever mounted on the edge of the trunk lid, and fastened to a striker mounted on a vehicle body, a release lever for operating the latch lever, and a cinching lever for cinching a first stage locking state by the latch lever to a second stage locking state.

Further, the second cable is connected to the cinching lever, and the output gear rotates clockwise in the first stage locking state, such that the second cable is pulled to operate the cinching lever.

Further, the drum member includes a drum wound by the first cable, and rotatably coupled to a drum shaft coupled to the drum bracket, a return spring coupled between the drum shaft and the drum, a drum lever formed to extend from one side end of the drum, and a lever pin coupled to the edge of the drum lever to be perpendicular to the drum lever.

Further, the lever pin is inserted into a circular lever groove formed in the drum bracket.

Next, an apparatus for automatically opening and closing a trunk lid according to another embodiment of the present disclosure includes a power latch including a latch lever mounted on the edge of a trunk lid, and fastened to a striker mounted on a vehicle body, a release lever for operating the latch lever, and a cinching lever for cinching a first stage locking state by the latch lever to a second stage locking state, a drum member rotatably coupled to a drum bracket fastened to a hinge arm, a power latch cinching actuator including an output gear having a circular cross section rotated by a motor embedded in a housing, and having a first slot and a second slot with an arc shape formed on the front surface thereof, an elastic spring having one end coupled to the drum member and the other end coupled to the trunk lid, a first cable connected to the drum member, and having the edge inserted into the first slot, and a second cable connected to the cinching lever, and having the edge inserted into the second slot.

Further, the power latch cinching actuator may further include a torsion spring coupled between the housing and the output gear.

Further, the drum member includes a drum wound by the first cable, and rotatably coupled to a drum shaft coupled to the drum bracket, a return spring coupled between the drum shaft and the drum, a drum lever formed to extend from one side end of the drum, and a lever pin coupled to the edge of the drum lever to be perpendicular to the drum lever, in which the lever pin is inserted into a circular lever groove formed in the drum bracket.

The apparatus for automatically opening and closing the trunk lid according to embodiments of the present disclosure may delete the drive unit, thereby decreasing the weight of the vehicle and decreasing the manufacturing cost.

Therefore, embodiments of the present disclosure may also be applied to the small to medium-sized vehicles, thereby enhancing the customer's convenience.

BRIEF DESCRIPTION OF THE DRAWINGS

FIGS. 5A to 12B sequentially illustrate operating states of the apparatus for automatically opening and closing the trunk lid according to an embodiment of the present disclosure.

FIGS. 5A, 6A, 7A, 10A, 10C, and 12A illustrate a power latch in each state.

FIGS. 5B, 6B, 7B, 10B, and 12B illustrate a power latch cinching actuator in each state.

DETAILED DESCRIPTION OF ILLUSTRATIVE EMBODIMENTS

To fully understand the present disclosure, the operational advantages of the present disclosure, and an object achieved by the practice of the present disclosure, the accompanying drawings illustrating preferred exemplary embodiments of the present disclosure and the contents illustrated in the accompanying drawings should be referred.

In describing the preferred exemplary embodiments of the present disclosure, the description of the known technology or the repetitive description which may unnecessarily obscure the gist of the present disclosure will be reduced or omitted.

Figure 1:
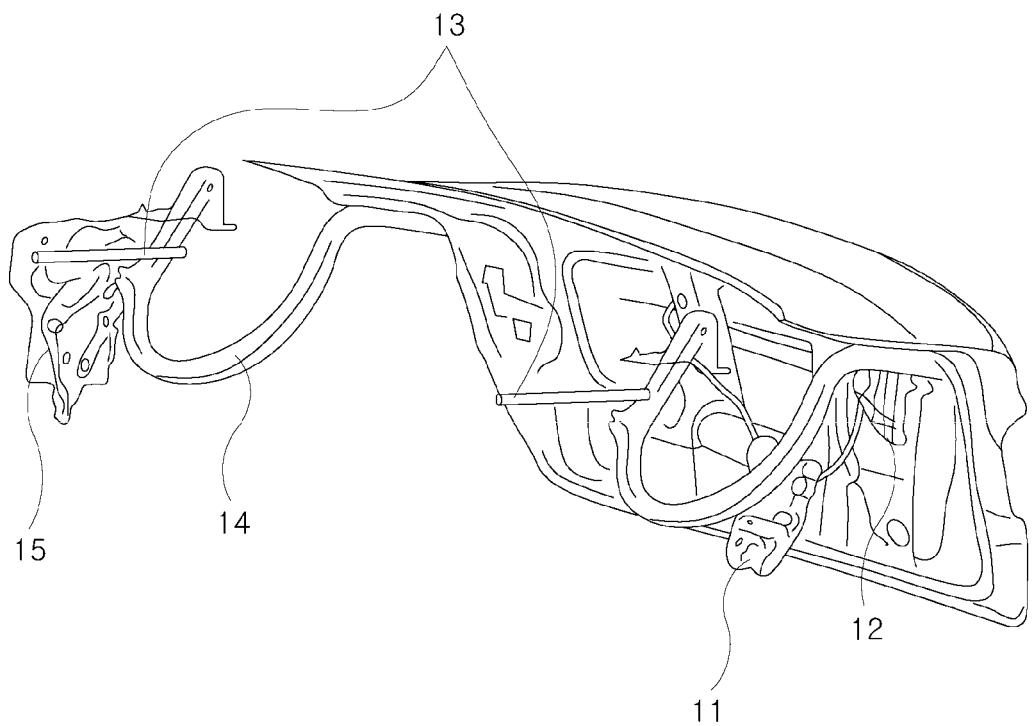
FIG. 1 schematically illustrates a general apparatus for automatically opening and closing a trunk lid.
Figure 2:
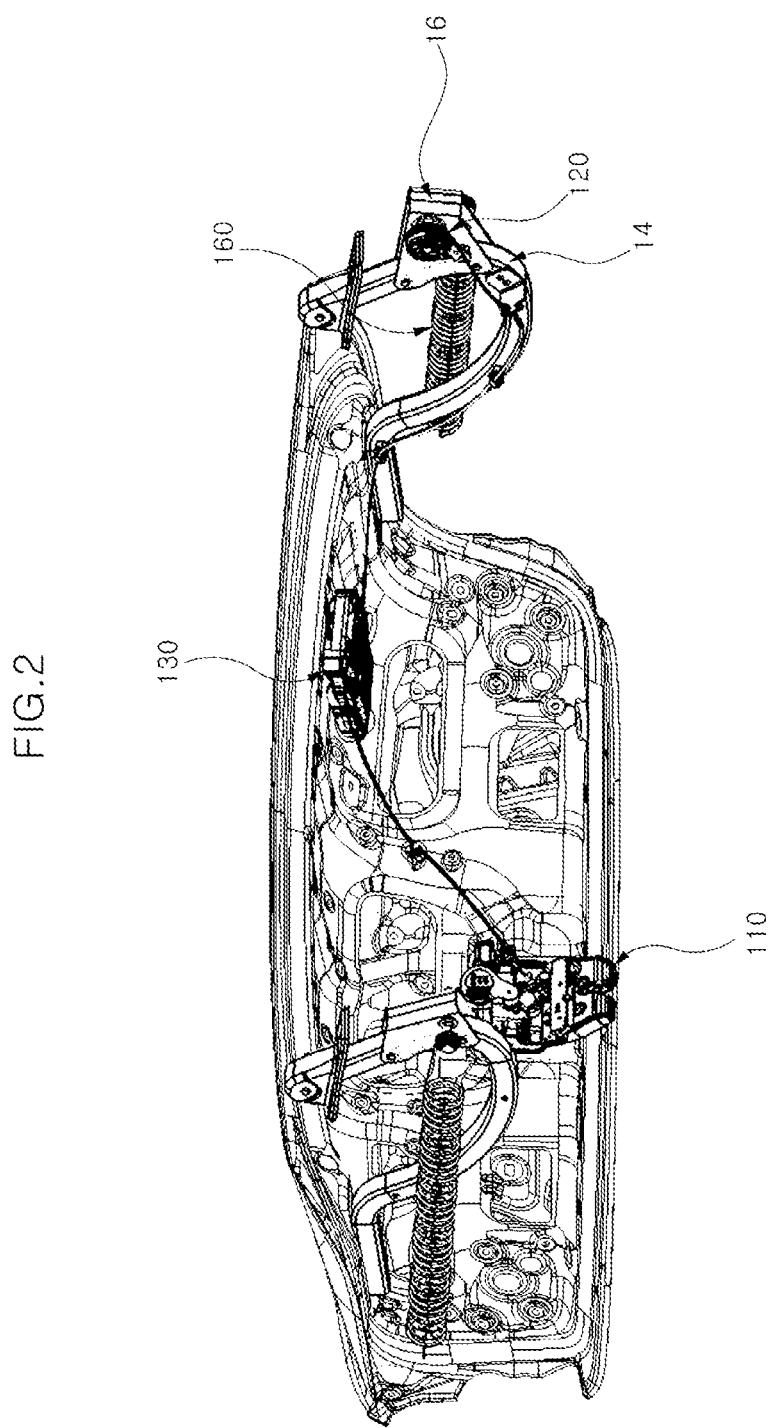
FIG. 2 schematically illustrates an apparatus for automatically opening and closing a trunk lid according to an embodiment of the present disclosure.
Figure 3:
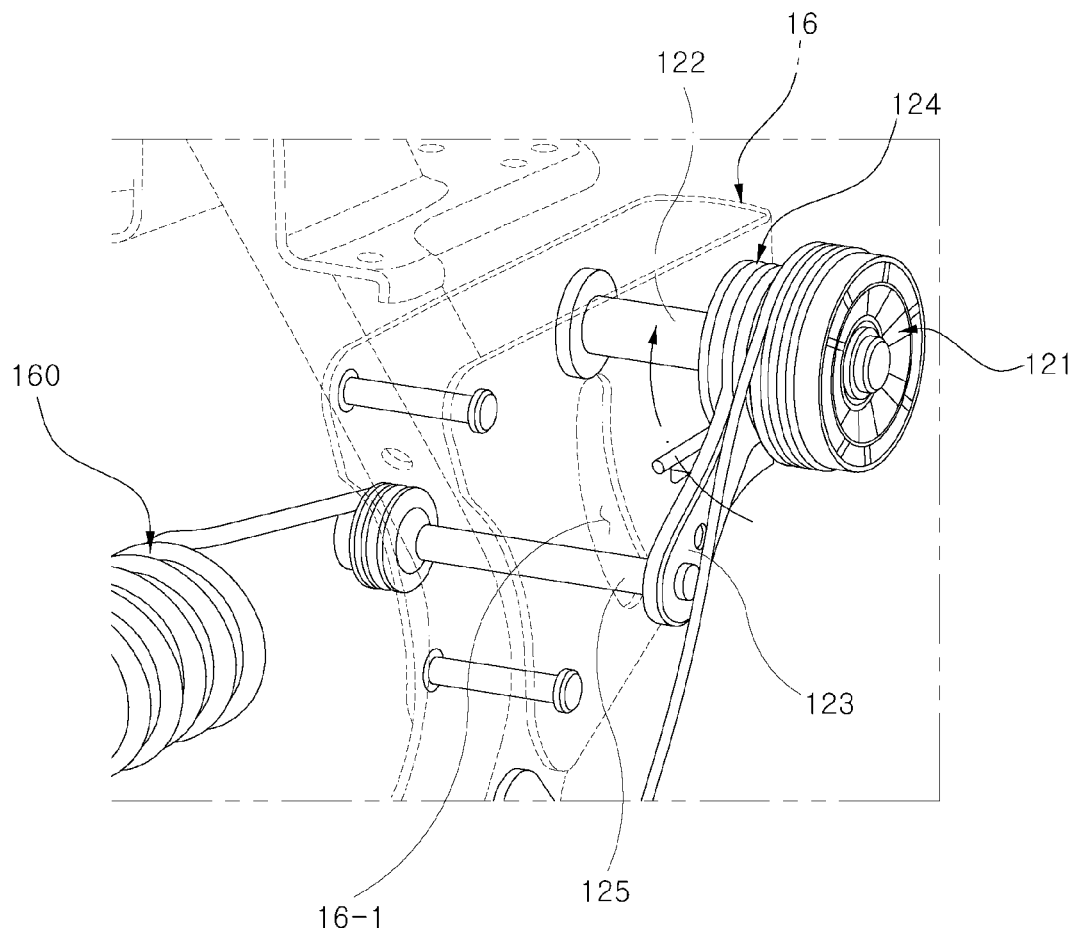
FIGS. 3 and 4 are enlarged diagrams of one configuration of the apparatus for automatically opening and closing the trunk lid according to an embodiment of the present disclosure.
Figure 4:
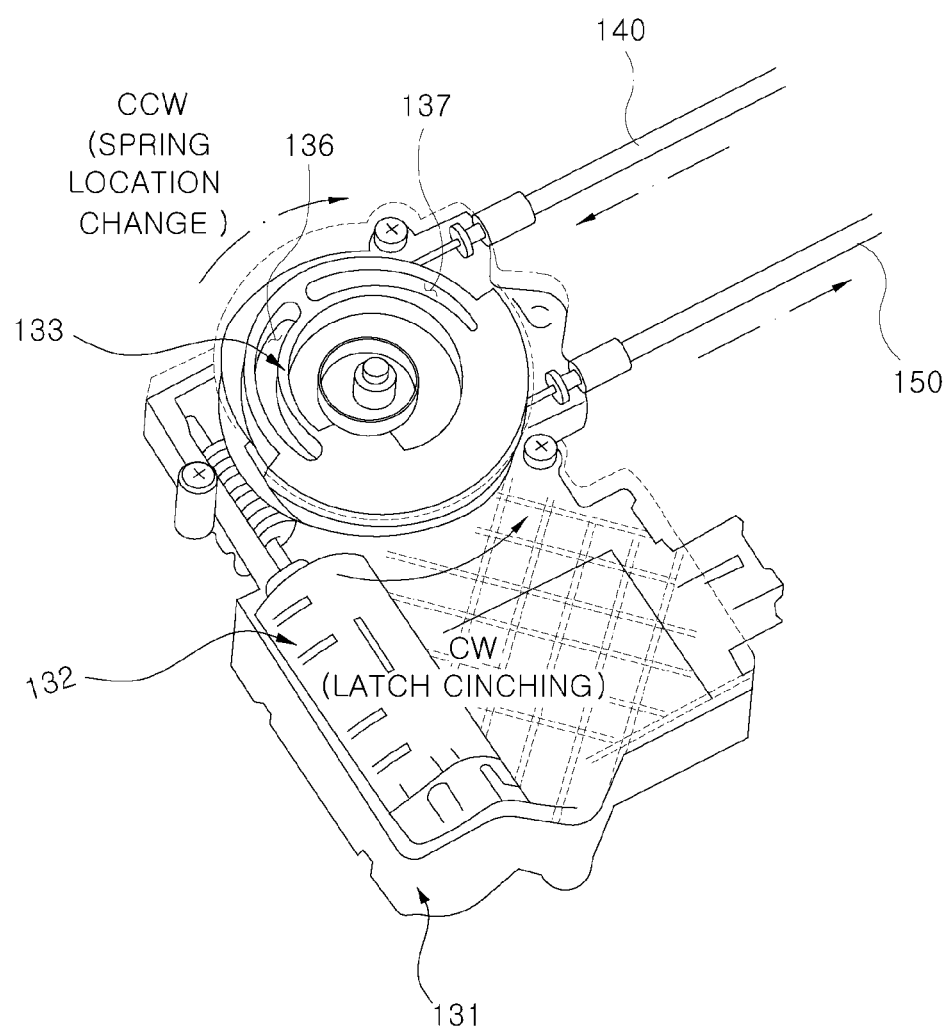

FIG. 2 schematically illustrates an apparatus for automatically opening and closing a trunk lid according to an embodiment of the present disclosure, and FIGS. 3 and 4 are enlarged diagrams of one configuration of the apparatus for automatically opening and closing the trunk lid according to an embodiment of the present disclosure.

Hereinafter, an apparatus for automatically opening and closing a trunk lid according to an exemplary embodiment of the present disclosure will be described with reference to FIGS. 2 to 4.

The present disclosure relates to an apparatus for automatically opening and closing a trunk lid. Particular embodiments relate to an apparatus for automatically opening and closing a trunk lid using a conventional power latch cinching actuator without applying a conventional drive unit.

To this end, the apparatus for automatically opening and closing the trunk lid includes a power latch no, a drum member 120, a power latch cinching actuator 130, a first cable 140, a second cable iso, and an elastic spring 160.

The power latch no is mounted on the edge of the trunk lid, and includes a latch lever in, a release lever 112, a cinching lever 113, and the like, such that the latch lever 111 is fastened to or released from a striker mounted on a vehicle body by the operation of the release lever 112, and thus the trunk lid is in a closed state or an opened state.

The second cable 150 to be described later is connected to the cinching lever 113.

The drum member 120 is mounted on a drum bracket 16 fastened to the hinge arm 14, and includes a drum 121, a drum shaft 122, a drum lever 123, a return spring 124, and a lever pin 125.

The first cable 140 connected to the power latch cinching actuator 130 is wound around the circumference of the drum 121, and rotatably coupled to the drum shaft 122 coupled to the drum bracket 16.

Further, the return spring 124 is configured to be coupled between the drum shaft 122 and the drum 121 such that the drum 121 is rotated and then returns to the original state when an external force is released.

The drum lever 123 is a lever formed to extend from one side end of the drum 121, and the lever pin 125 is coupled to the edge of the drum lever 123 to be perpendicular to the drum lever 123.

Further, the lever pin 125 penetrates a curved lever groove 16-1 formed in the drum bracket 16 such that the location of the lever pin 125 is moved within the lever groove 16-1, thereby restricting the rotating operation of the drum 121.

Next, the power latch cinching actuator 130 allows the latch lever 111 to cinch a latch first stage locking state of being fastened to the striker to a latch second stage locking state when the trunk lid is closed, and mounted on the inner surface of one side of the front of the trunk lid.

The power latch cinching actuator 130 has a motor 132 and an output gear 133 embedded in a housing 131 to rotate the output gear 133 having a circular cross section by the operation of the motor 132 by a control signal. That is, the operation of the motor 132 rotates a motor gear, and rotates the output gear 133 engaged with the motor gear.

The first cable 140 or the second cable 150 connected to the output gear 133 are pulled by the rotating operation of the output gear 133, such that the opening operation of the trunk lid and the latch cinching operation are performed by the drum member 120.

The first cable 140 is inserted into the output gear 133 through a first cable inlet 134 formed in the housing 131, and the second cable 150 is inserted into the output gear 133 through a second cable inlet 135 formed in the housing 131.

As illustrated, the first cable 140 may be disposed to be connected along the hinge arm 14.

Further, the output gear 133 is formed with a first slot 136 and a second slot 137 into which the edges of the first cable 140 and the second cable 150 may be inserted, respectively.

Further, cable pins are coupled to the edges of the first cable 140 and the second cable 150 and each of them is inserted into the first slot 136 and the second slot 137 and may be operated within the range of the first slot 136 and the second slot 137.

Furthermore, the first slot 136 and the second slot 137 may be holes formed in one surface in an arc shape having a constant length corresponding to the circular circumference of the output gear 133.

Further, the placements of the first slot 136 and the second slot 137 may be an arc shape disposed on the concentric circle having different radiuses.

Meanwhile, a torsion spring 138 is coupled between the output gear 133 and the housing 131 and configured such that the output gear 133 is rotated by the torsion spring 138 and then returns to the original state when an external force is released.

The elastic spring 160 has one end coupled to the drum lever 123 of the drum member 120, and the other end coupled to a vehicle body, thereby adding an elastic force when the trunk lid is opened and closed.

Hereinafter, the operating states of the apparatus for automatically opening and closing the trunk lid according to embodiments of the present disclosure described above will be described.

FIGS. 5A to 13B sequentially illustrate the operating states of the apparatus for automatically opening and closing the trunk lid according to embodiments of the present disclosure.

Further, FIGS. 5A, 6A, 7A, 10A, 10C, and 12A illustrate a power latch in each state, FIGS. 5B, 6B, 7B, 8A, 10B, 11 and 12B illustrate a power latch cinching actuator in each state, and FIGS. 5C, 6C, 7C, 8B, 9B, 9A, and 9B illustrate a drum member and a spring in each state.

Figure 5A:
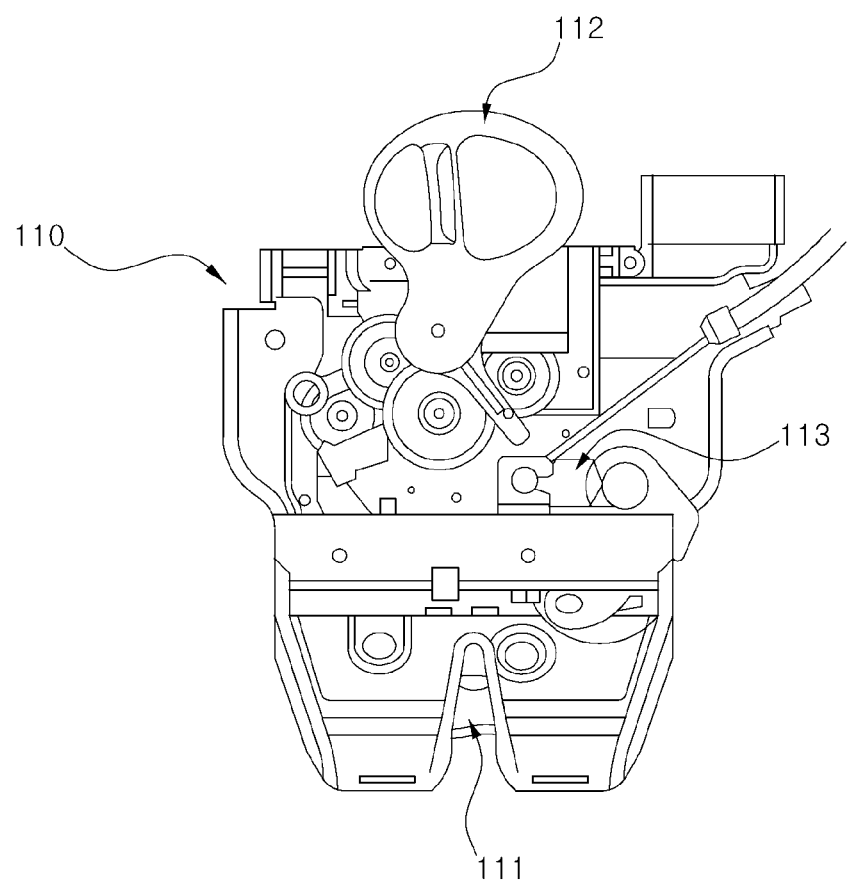
Figure 5B:
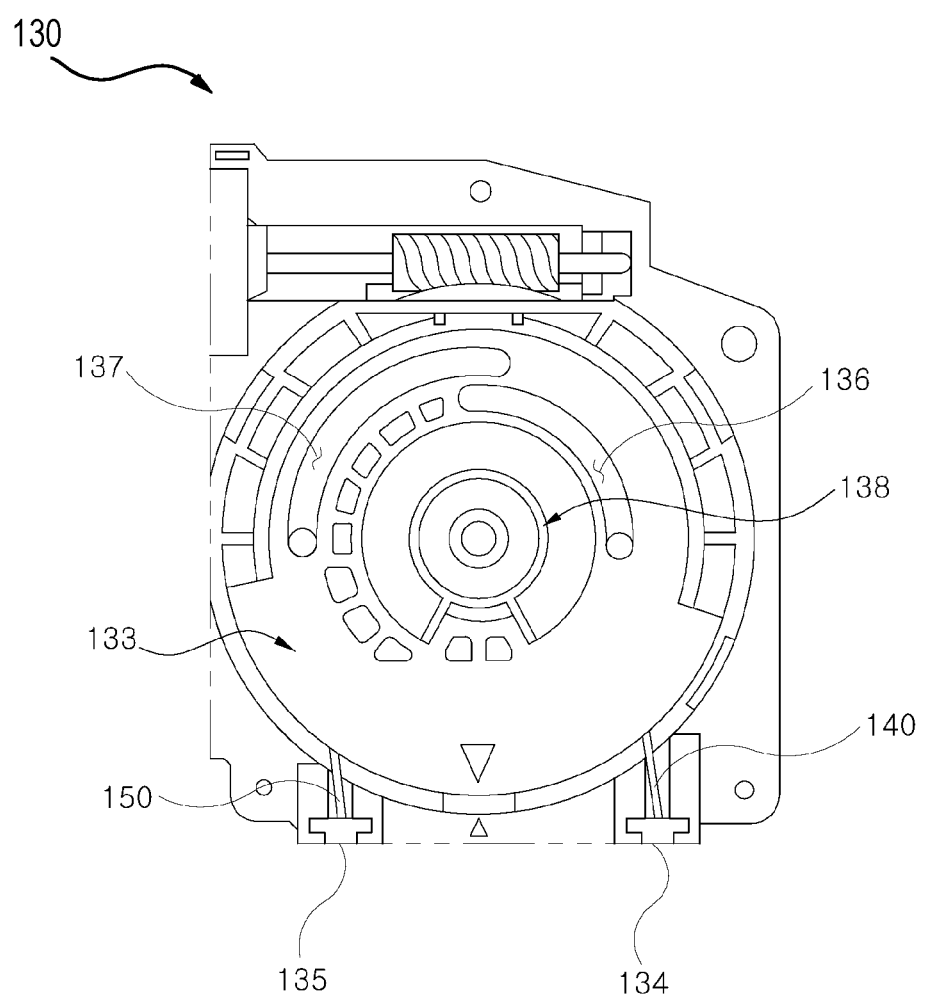

As illustrated in FIG. 5A, in the state where the trunk lid is closed by the latch lever in, the output gear 133 of the power latch cinching actuator 130 becomes a normal state illustrated in FIG. 5B.

One end of the first slot 136 is located in the 3 o'clock direction of the output gear 133, and the other end thereof is located in the 12 o'clock direction of the output gear 133, with respect to the front surface of the output gear 133 in the normal state illustrated in FIG. 5B.

Further, one end of the second slot 137 is located in the 9 o'clock direction of the output gear 133, and the other end thereof is located in the 12 o'clock direction of the output gear 133.

The first cable inlet 134 and the second cable inlet 135 are formed on one side surface of the housing 131, and the 12 o'clock direction of the output gear 133 becomes the location adjacent to the other side surface opposite to one side surface of the housing 131 in which the first cable inlet 134 and the second cable inlet 135 are formed.

Therefore, the first cable 140 is introduced into the output gear 133 through the first cable inlet 134 and inserted into the first slot 136, and the edge of the first cable 140 is located on one end of the first slot 136.

Further, the second cable 150 is introduced into the output gear 133 through the second cable inlet 135 and inserted into the second slot 137, and the edge of the second cable 150 is located on one end of the second slot 136.

Further, the torsion spring 138 becomes an equilibrium state.

Figure 5C:
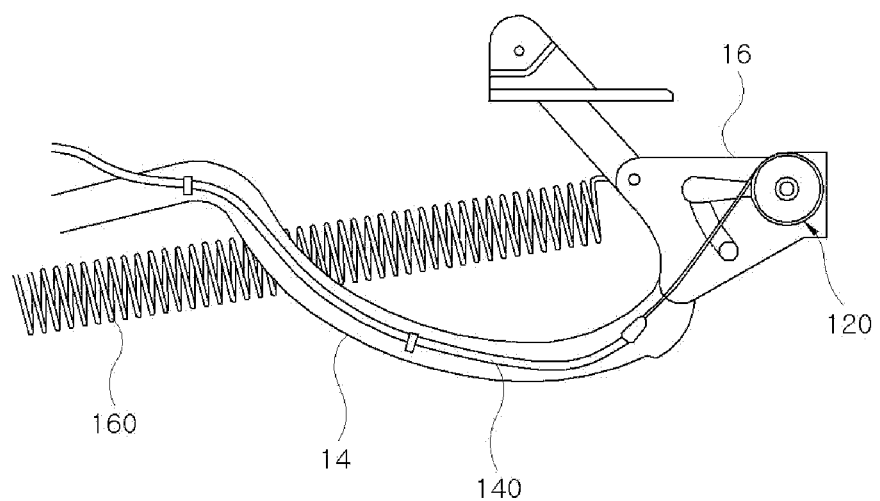
FIGS. 5C, 6C, 7C, 8B, 9A, and 9B illustrate a drum member and a spring in each state.

At this time, the state of the drum member 120, the hinge arm 14, and the elastic spring 160 is illustrated in FIG. 5C.

In the normal state, the drum lever 123 is located on one end of the lever groove 16-1, one end of the lever groove 16-1 is the highest location of the lever groove 16-1, and the other end thereof is the lowest location of the lever groove 16-1.

In this state, the state becomes Mw>Ms, where the moment (Mw) according to the first cable 140 is larger than the moment (Ms) according to the elastic spring 160.

Figure 6A:
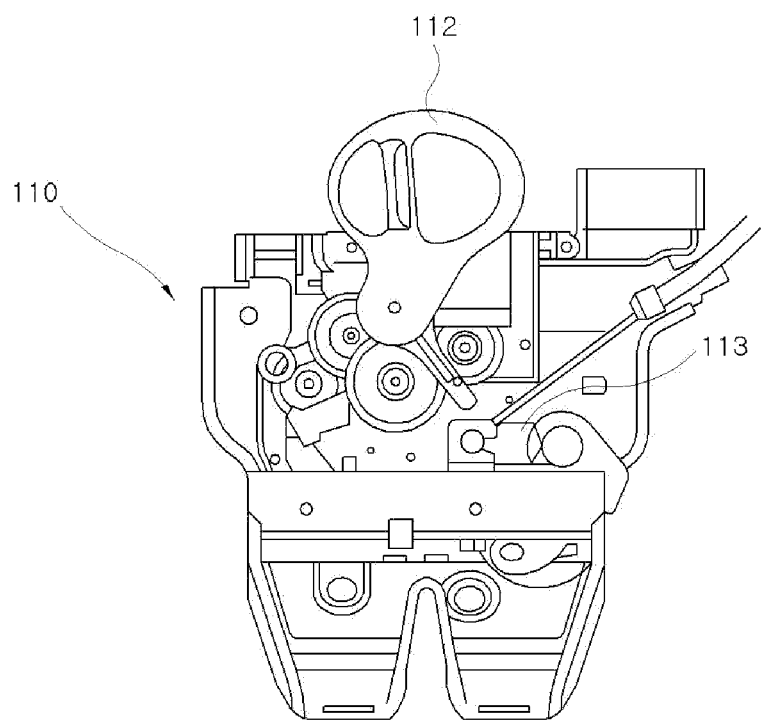
Figure 6B:
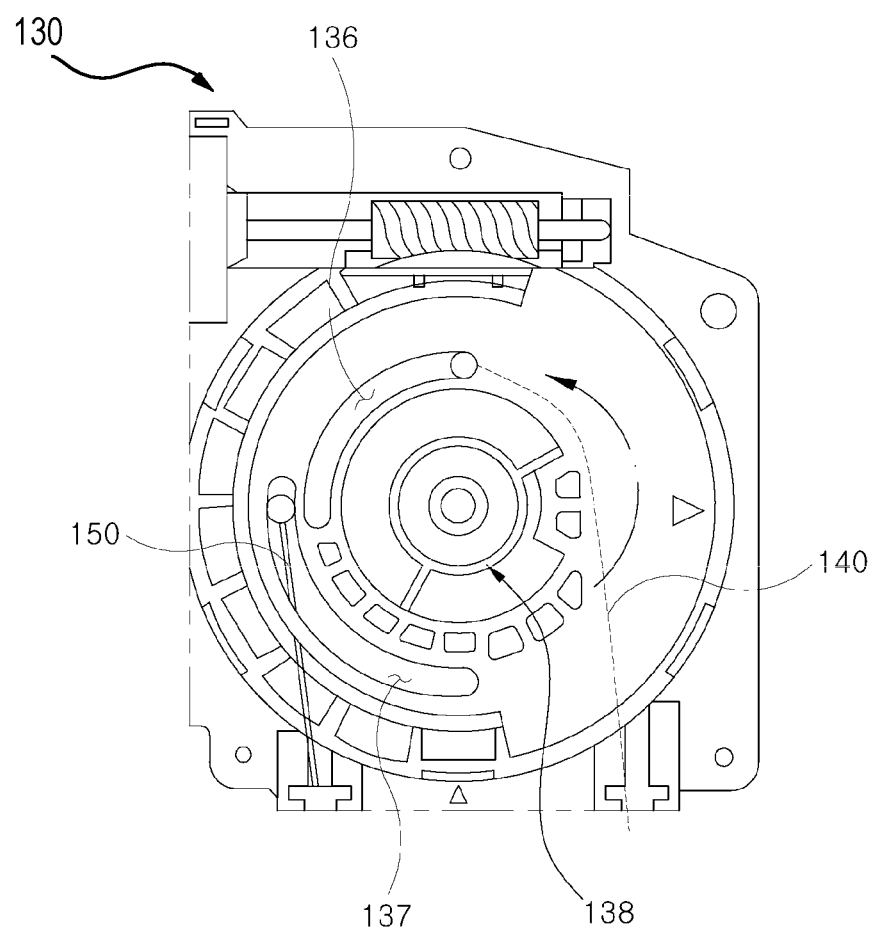

Next, as illustrated in FIG. 6A, the release lever 112 is rotated by the opening command of the trunk lid to be released from the striker, and the output gear 133 is rotated counterclockwise (CCW) with respect to the front surface by the operation of the motor 132 of the power latch cinching actuator 130, thereby becoming the state illustrated in FIG. 6B.

The output gear 133 is preferably set to be rotated 90 degrees counterclockwise, and in this case, as illustrated in FIG. 6B, one end of the first slot 136 is moved to the 12 o'clock direction, and the other end thereof is moved to the 9 o'clock direction, such that the first cable 140 located on one end of the first slot 136 is pulled to the 12 o'clock direction. Further, one end of the second slot 137 is located in the 6 o'clock direction and the other end thereof is located in the 9 o'clock direction, such that the second cable 150 is located on the other end of the second slot 137 but the second cable 150 substantially remains in place.

Figure 6C:
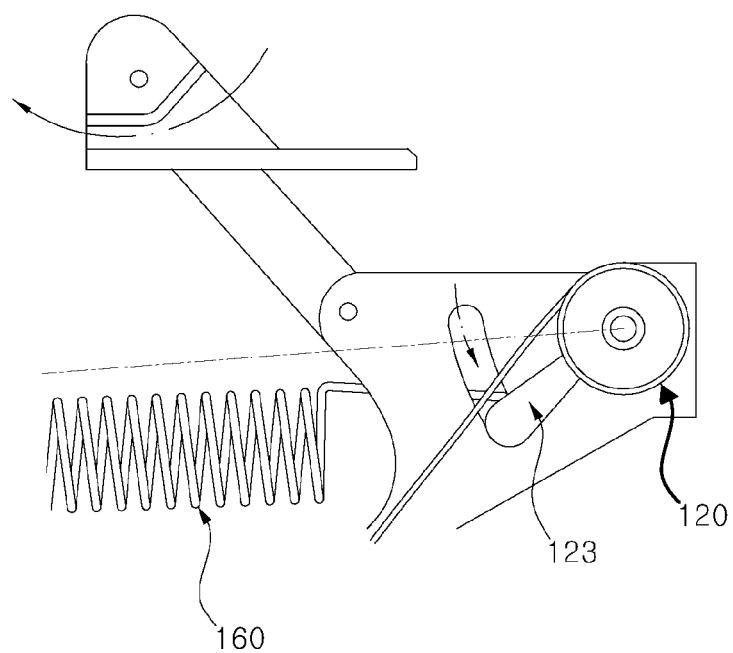

As described above, when the first cable 140 is pulled, as illustrated in FIG. 6C, the drum 121 and the drum lever 123 are rotated counterclockwise (CCW), and therefore, the edge of the drum lever 123 is located on the other end of the lever groove 16-1.

Therefore, when the location of the elastic spring 160 connected to the lever pin 125 is changed, the state becomes Mw<Ms where the moment Ms according to the elastic spring 160 is larger than the moment Mw according to the first cable 140, such that the hinge arm 14 starts to rotate.

Figure 7A:
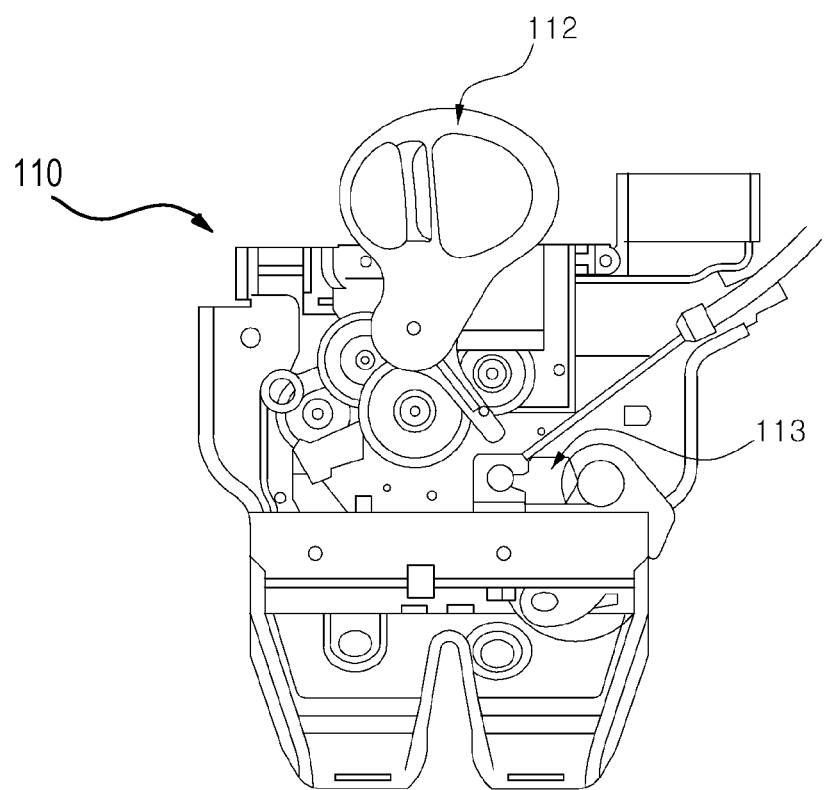
Figure 7B:
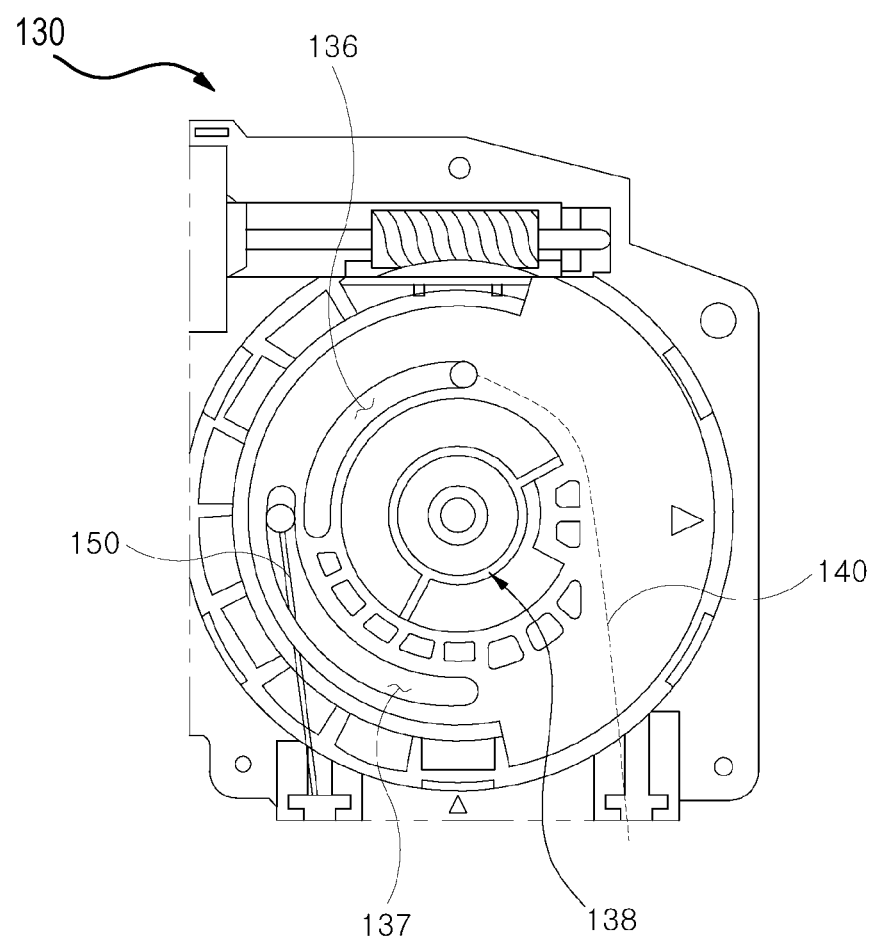
Figure 7C:
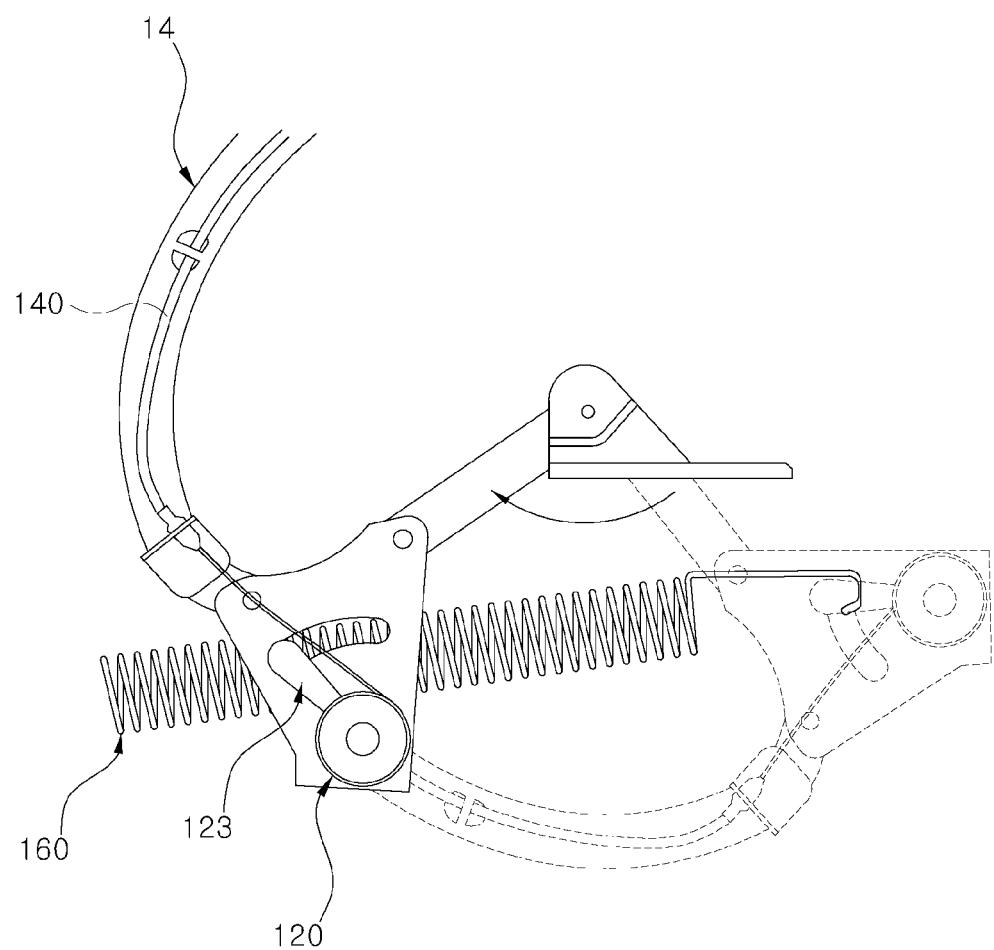

After the hinge arm 14 starts to rotate, as illustrated in FIG. 7A, the latch lever 111 maintains the released state; as illustrated in FIG. 7B, the output gear 133 maintains the previous state; and as illustrated in FIG. 7C, the hinge arm 14 is completely rotated, such that the trunk lid becomes the state of being opened.

In this state, when the closing command of the trunk lid is input again, the output gear 133 is rotated clockwise (CW) with respect to the front surface by the operation of the motor 132 of the power latch cinching actuator 130.

Figure 8A:
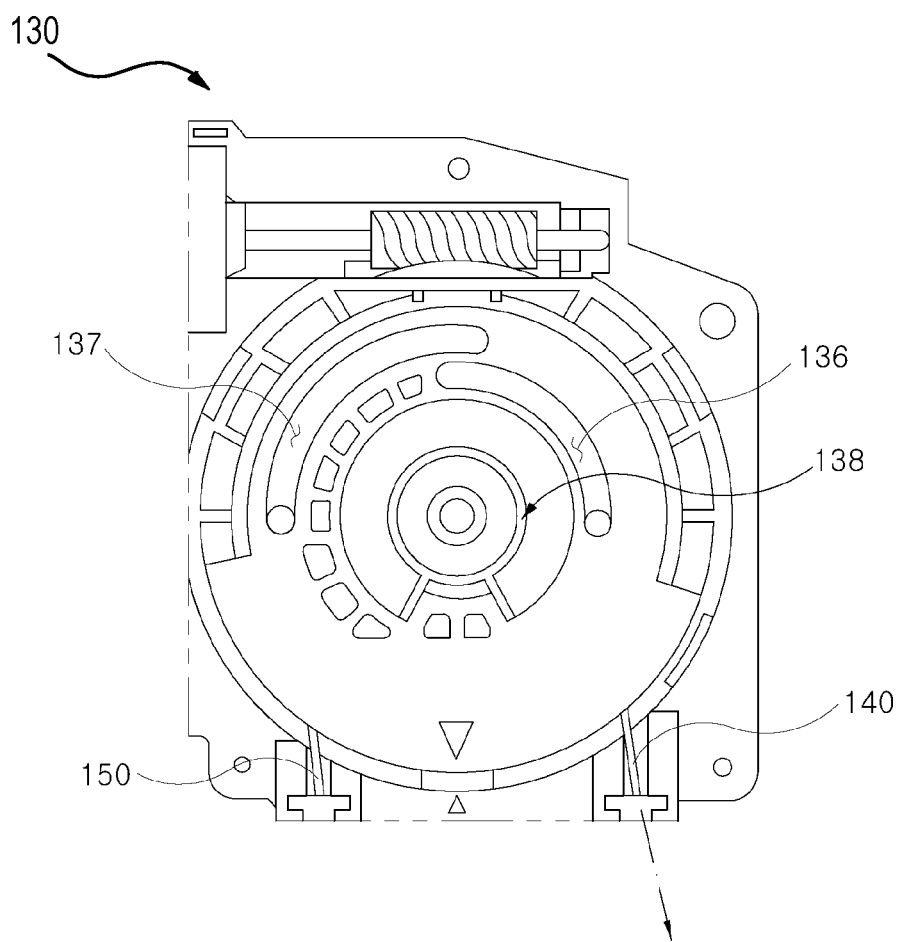

When the output gear 133 is rotated clockwise (CW), the first cable 140 is pulled by the drum 121 and located on one end of the first slot 136 which is located in the 3 o'clock direction of the output gear 133 (see FIG. 8A).

Figure 8B:
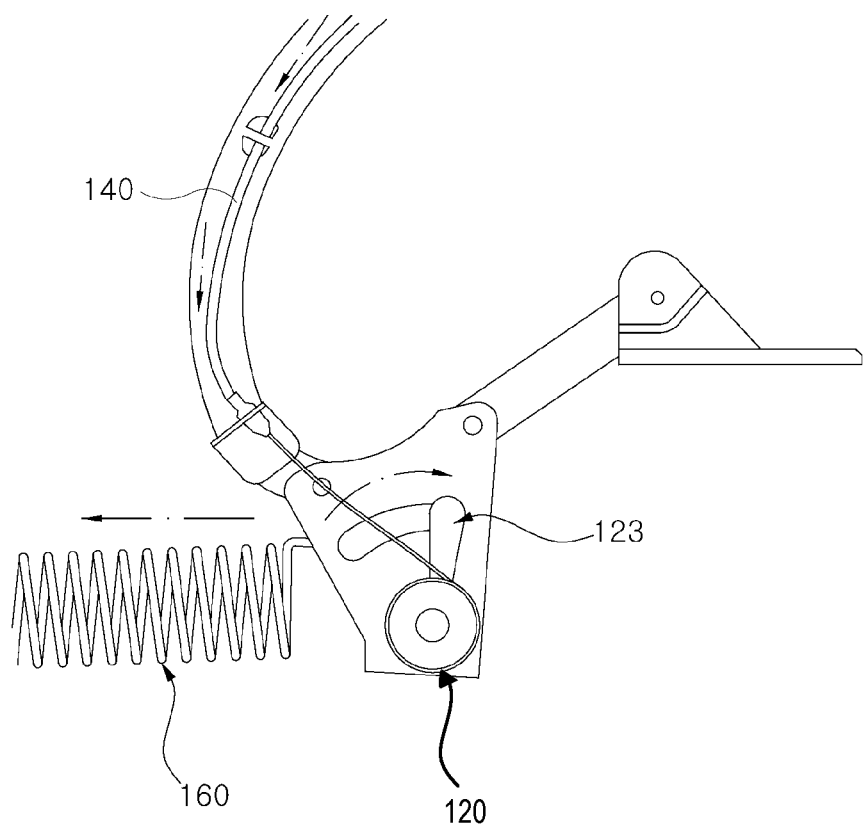
Figure 9A:
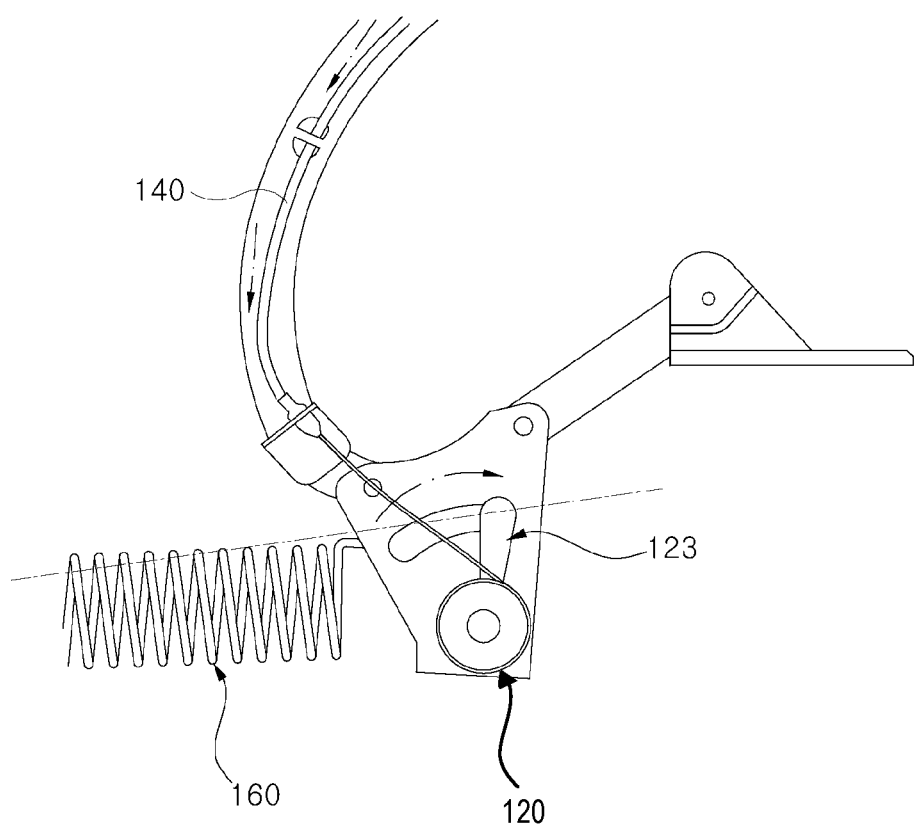
Figure 9B:
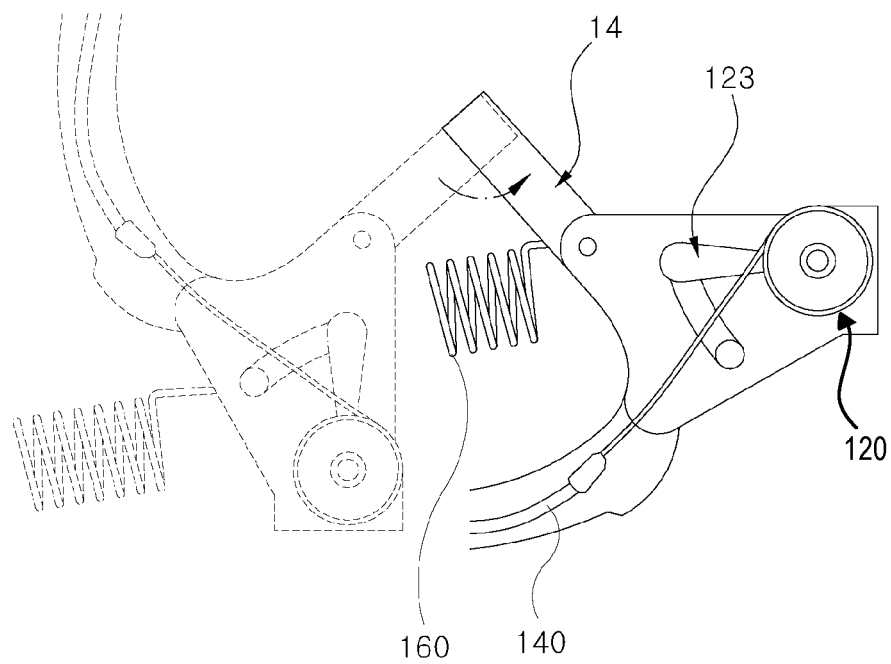

As illustrated in FIG. 8B, the location of the elastic spring 160 is changed by the rotation of the drum 121, thereby becoming the state of Mw/Ms, such that as illustrated in FIGS. 9A and 9B, the hinge arm 14 is rotated and thus the trunk lid is closed by its own weight.

Figure 10A:
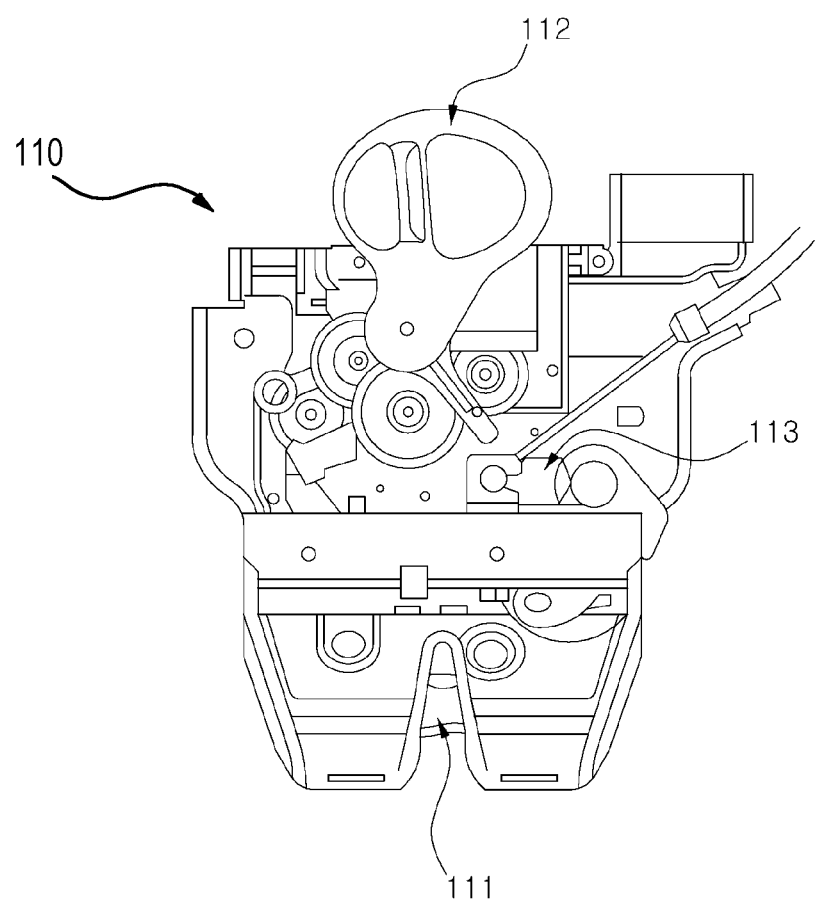

As described above, when the trunk lid moves downward, as illustrated in FIG. 10A, the latch lever in becomes the latch first stage locking state in which the latch lever 111 is fastened to the striker.

Figure 10B:
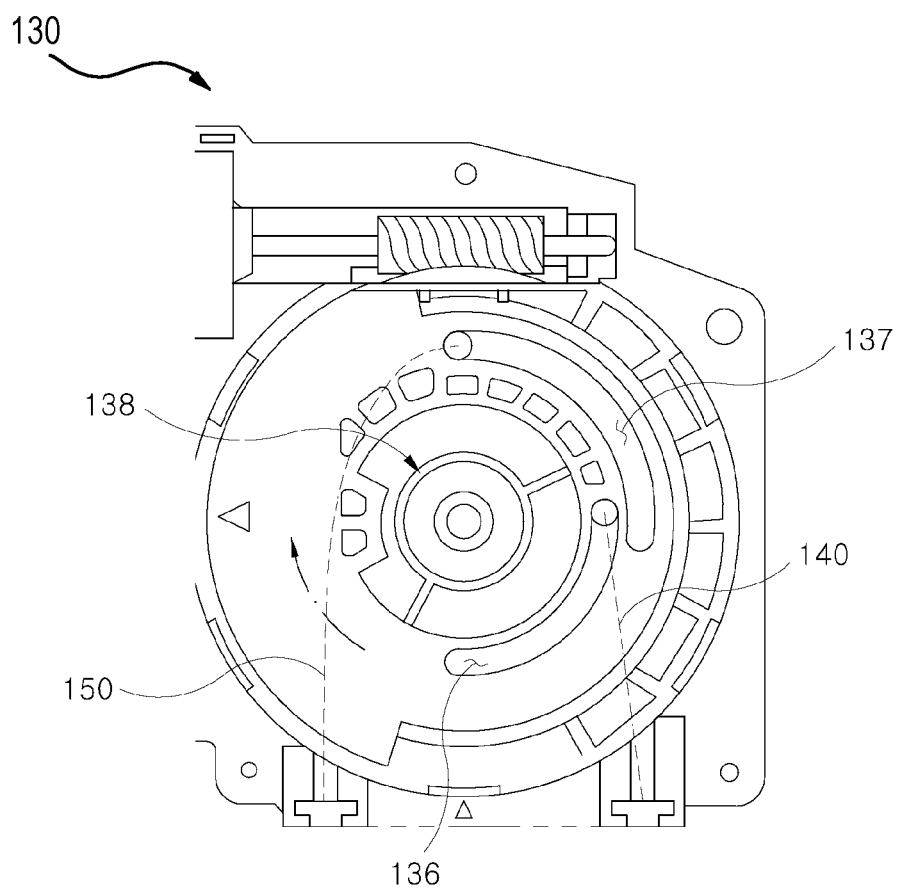

Next, when a latch first stage locking signal is generated, as illustrated in FIG. 10B, the motor 132 is operated, such that the output gear 133 is rotated 90 degrees clockwise (CW) with respect to the front surface, and in this case, one end of the first slot 136 is moved to the 6 o'clock direction, and the other end thereof is moved to the 3 o'clock direction, such that the first cable 140 located on one end of the first slot 136 is located on the other end of the first slot 136 in the state of remaining in place.

Further, one end of the second slot 137 is moved to the 12 o'clock direction and the other end thereof is moved to the 3 o'clock direction, such that the second cable 150 located on one end of the second slot 137 is pulled to the 12 o'clock direction.

Figure 10C:
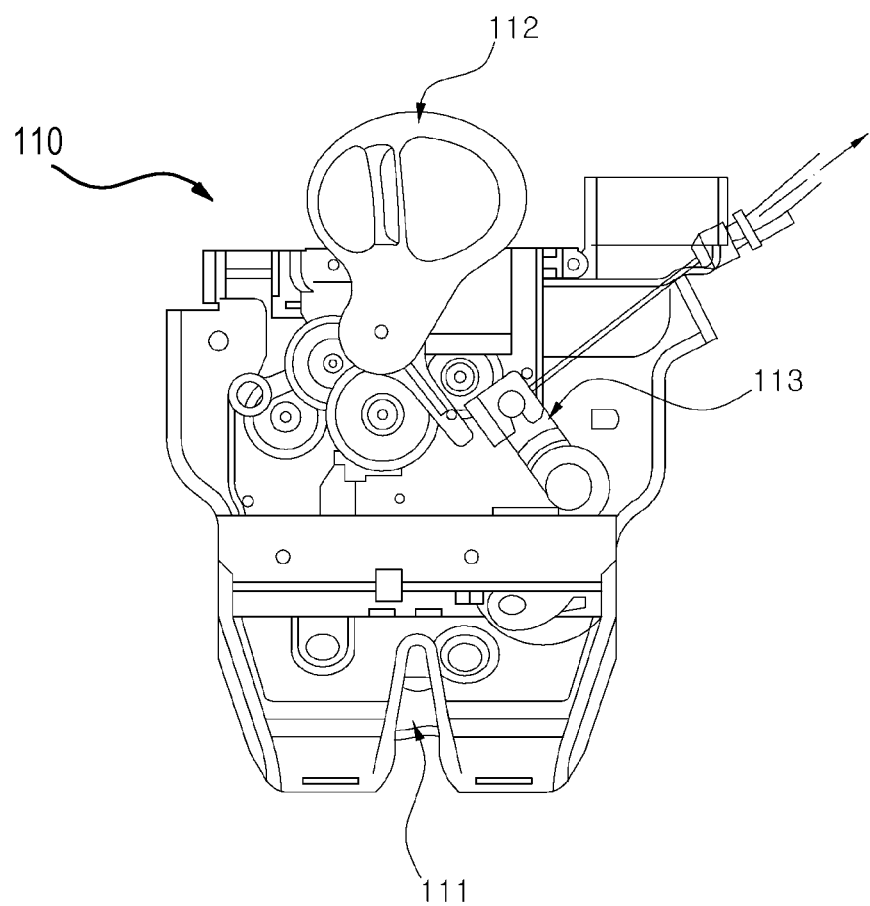
Figure 10D:
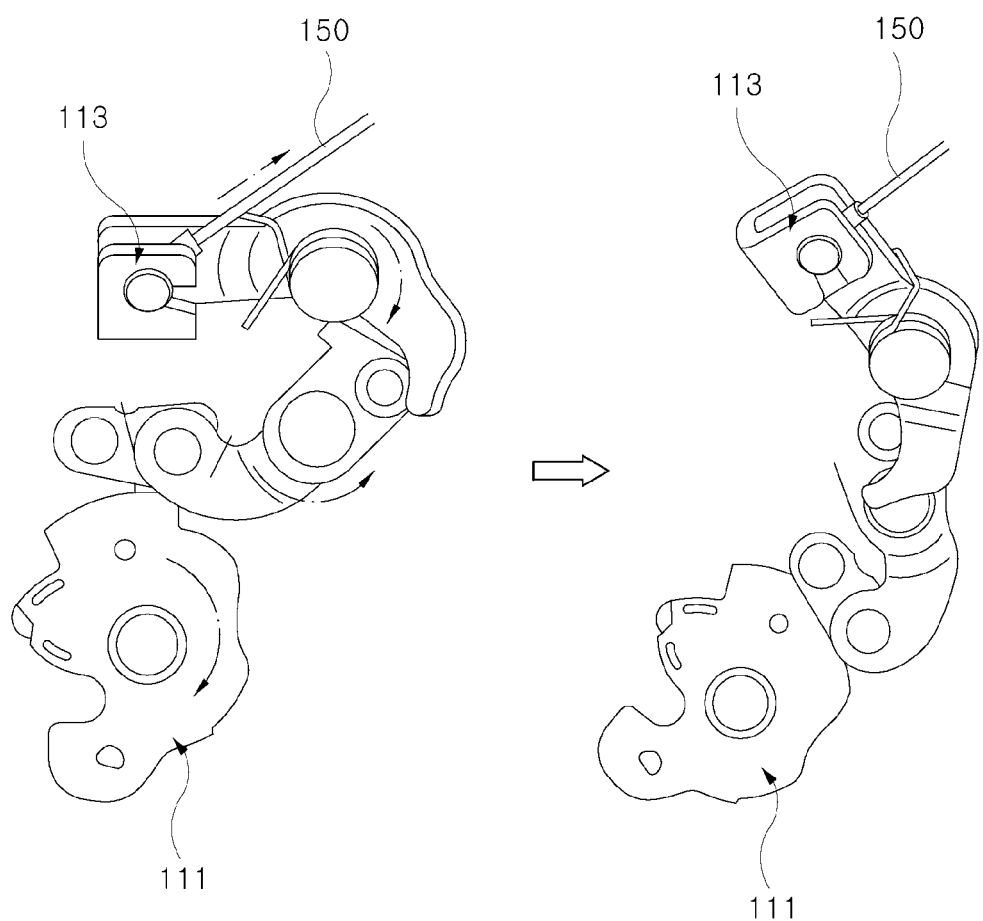

As described above, when the second cable 150 is pulled, as illustrated in FIGS. 10C and 10D, the cinching lever 113 connected to the second cable 150 is rotated, such that the latch lever 111 is also rotated by the cinching operation, thereby becoming the latch second stage locking state.

Figure 11:
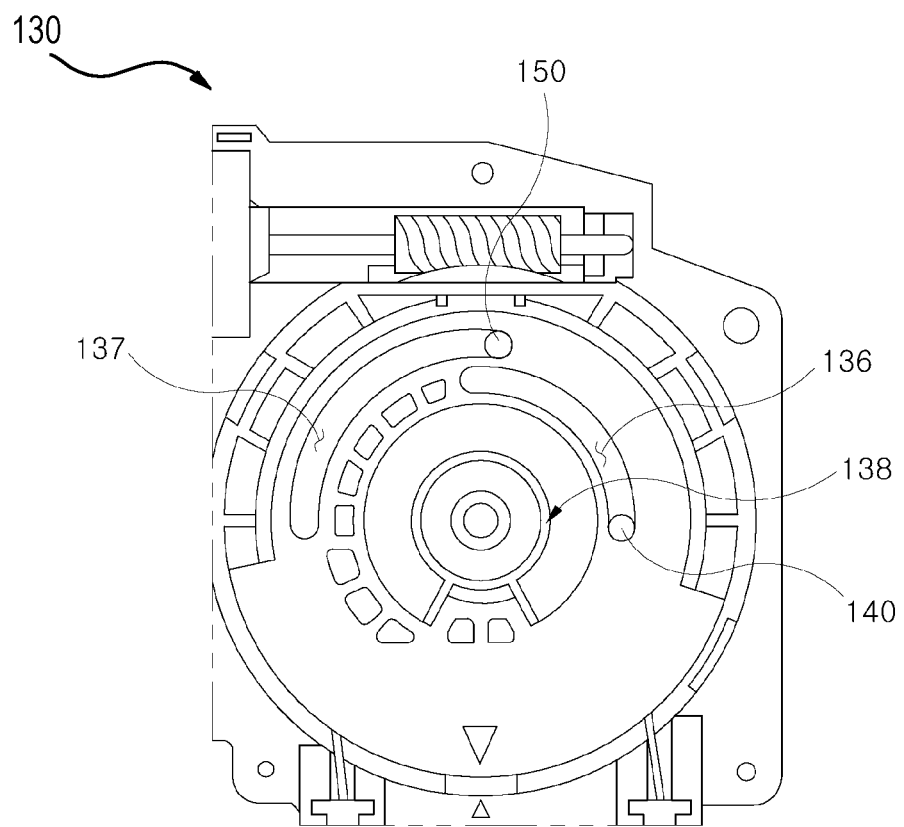

Then, the output gear 133 remains in place by the return operation of the torsion spring 138 of the power latch cinching actuator 130 or the actuator, as illustrated in FIG. 11, and the first cable 140 and the second cable 150 maintain the states thereof.

Figure 12A:
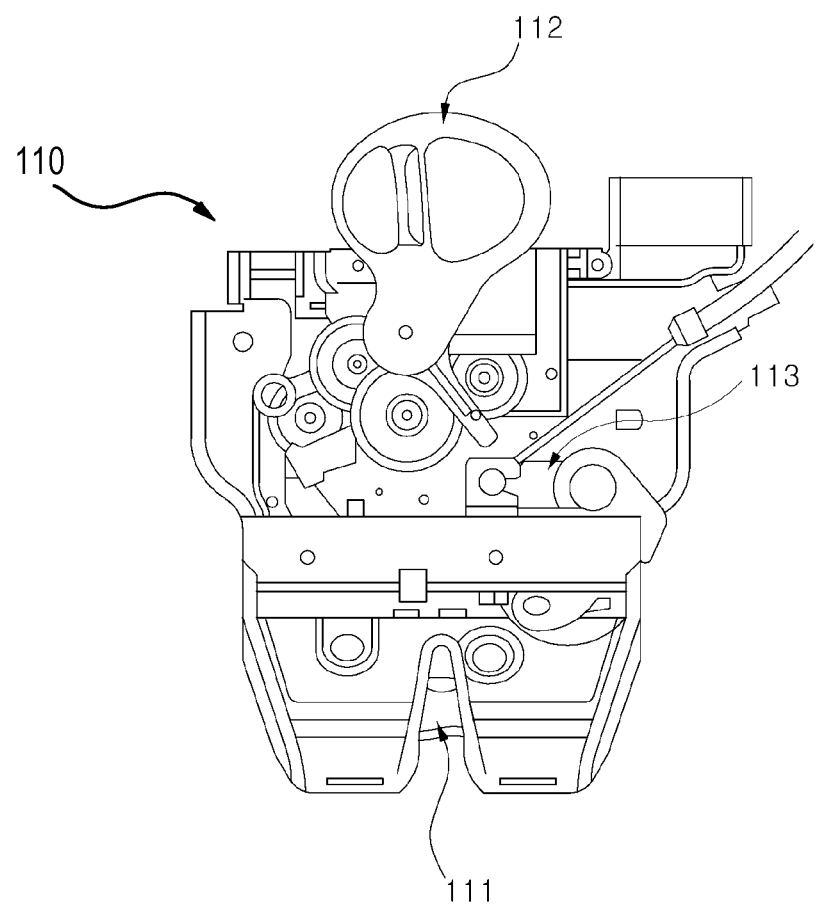
Figure 12B:
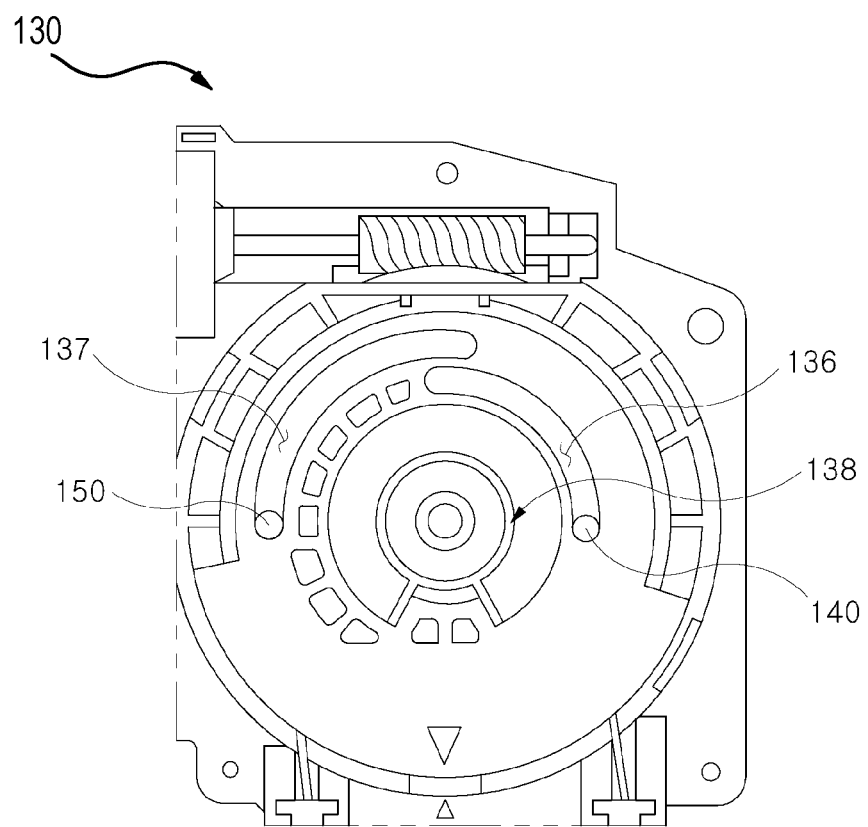

Then, as illustrated in FIG. 12A, the cinching lever 113 returns to the original location by the torsion spring of the cinching lever 113, and therefore, the second cable 150 is pulled to return to the original location, as illustrated in FIG. 12B.

As described above, according to the apparatus for automatically opening and closing the trunk lid according to embodiments of the present disclosure, the moment (Ms) according to the elastic spring becomes larger than the moment (Mw) by the weight of the trunk when the trunk lid is opened even without the drive unit, thereby enabling the automatic opening, and the state becomes Mw>Ms when the trunk is closed, such that the trunk is closed by its own force by its own weight of the trunk.

The aforementioned present disclosure has been described with reference to the illustrated drawings but is not limited to the described exemplary embodiments, and it is apparent to those skilled in the art that the present disclosure may be variously modified and changed without departing from the spirit and scope of the present disclosure. Therefore, the modified examples or the changed examples should fall within the claims of the present disclosure, and the scope of the present disclosure should be interpreted based on the appended claims.

What is claimed is:

1. An apparatus for automatically opening and closing a trunk lid, the apparatus comprising:
   a drum member connected to a first cable and rotatably coupled to a drum bracket fastened to a hinge arm;
   a power latch cinching actuator comprising an output gear configured to be rotated by a motor embedded in a housing; and
   an elastic spring having a first end coupled to the drum member and a second end configured to be coupled to the trunk lid,
   wherein the first cable is coupled to the output gear and is configured to rotate the drum member in a first direction by the rotation of the output gear.

2. The apparatus of claim 1, wherein the output gear includes a first slot and a second slot having an arc shape.

3. The apparatus of claim 2, wherein an edge of the first cable is inserted into the first slot and an edge of a second cable is inserted into the second slot.

4. The apparatus of claim 3, wherein in a closed state of the trunk lid, the edge of the first cable is located on one end of the first slot, and the edge of the second cable is located on one end of the second slot.

5. The apparatus of claim 4, further comprising:
   a power latch comprising a latch lever configured to be mounted on an edge of the trunk lid and fastened to a striker configured to be mounted on a vehicle body;
   a release lever configured to operate the latch lever; and
   a cinching lever configured to cinch a first stage locking state by the latch lever to a second stage locking state.

6. The apparatus of claim 5, wherein the second cable is connected to the cinching lever, and the output gear is configured to rotate clockwise in the first stage locking state, such that the second cable is pulled to operate the cinching lever.

7. The apparatus of claim 4, wherein the drum member comprises:
   a drum configured to be wound by the first cable and rotatably coupled to a drum shaft coupled to the drum bracket;
   a return spring coupled between the drum shaft and the drum;
   a drum lever extending from one side end of the drum; and
   a lever pin coupled to an edge of the drum lever to be perpendicular to the drum lever.

8. The apparatus of claim 7, wherein the lever pin is inserted into a circular lever groove in the drum bracket.

9. The apparatus of claim 1, wherein the output gear is configured to be rotated 90 degrees counterclockwise when an opening command of the trunk lid is applied.

10. An apparatus for automatically opening and closing a trunk lid, the apparatus comprising:
    a drum member connected to a first cable and rotatably coupled to a drum bracket fastened to a hinge arm;
    a power latch cinching actuator comprising an output gear configured to be rotated by a motor embedded in a housing; and
    an elastic spring having a first end coupled to the drum member and a second end configured to be coupled to the trunk lid,
    wherein the first cable is coupled to the output gear and is configured to rotate the drum member in a first direction by rotation of the output gear, and
    wherein by an opening command, the output gear is configured to be rotated counterclockwise, such that the first cable is pulled.

11. The apparatus of claim 10, wherein the power latch cinching actuator further comprises a torsion spring coupled between the housing and the output gear.

12. The apparatus of claim 11, wherein when a closing command of the trunk lid is applied, the drum member is configured to be rotated in a second direction to pull the first cable, such that the first cable returns to a location in a closed state of the trunk lid.

13. The apparatus of claim 12, wherein a location of the elastic spring is configured to be changed as the drum member rotates in the second direction, such that a moment according to the first cable becomes larger than a moment according to the elastic spring.

14. The apparatus of claim 10, wherein a location of the elastic spring is configured to be changed as the drum member rotates in the first direction, such that a moment according to the elastic spring becomes larger than a moment according to the first cable.

15. A vehicle comprising:
a vehicle body;
a trunk lid coupled to the vehicle body by a hinge arm;
a drum bracket fastened to the hinge arm;
a drum member rotatably coupled to the drum bracket and connected to a first cable;
a power latch cinching actuator comprising an output gear configured to be rotated by a motor embedded in a housing; and
an elastic spring having a first end coupled to the drum member and a second end coupled to the trunk lid,
wherein the first cable is coupled to the output gear and is configured to rotate the drum member in a first direction by rotation of the output gear.

16. The vehicle of claim 15, wherein:
the output gear includes a first slot and a second slot having an arc shape; and
an edge of the first cable is inserted into the first slot and an edge of a second cable is inserted into the second slot.

17. The vehicle of claim 16, wherein in a closed state of the trunk lid, the edge of the first cable is located on one end of the first slot, and the edge of the second cable is located on one end of the second slot.

18. The vehicle of claim 17, further comprising:
a power latch comprising a latch lever mounted on an edge of the trunk lid and fastened to a striker mounted on the vehicle body;
a release lever configured to operate the latch lever; and
a cinching lever configured to cinch a first stage locking state by the latch lever to a second stage locking state.

19. The vehicle of claim 18, wherein the second cable is connected to the cinching lever and the output gear is configured to rotate clockwise in the first stage locking state, such that the second cable is pulled to operate the cinching lever.

20. The vehicle of claim 17, wherein the drum member comprises:
a drum configured to be wound by the first cable and rotatably coupled to a drum shaft coupled to the drum bracket;
a return spring coupled between the drum shaft and the drum;
a drum lever extending from one side end of the drum; and
a lever pin coupled to an edge of the drum lever to be perpendicular to the drum lever,
wherein the lever pin is inserted into a circular lever groove in the drum bracket.

* * * * *